United States Patent Office 3,437,550
Patented Apr. 8, 1969

3,437,550
GLASS FIBER REINFORCED CRYSTALLINE POLY-PROPYLENE COMPOSITION AND LAMINATE
James T. Paul, Jr., Wilmington, Del., assignor to Hercules Incorporated, Wilmington, Del., a corporation of Delaware
No Drawing. Filed Jan. 7, 1966, Ser. No. 519,005
Int. Cl. B32b 29/12, 19/08, 17/06
U.S. Cl. 161—93                                     26 Claims This invention relates to inorganic fiber reinforced propylene polymer molding compositions. More specifically it relates to such compositions which exhibit unusually high flexural strength and modulus.

In recent years, inorganic fibers such as e.g., glass and asbestos have become very popular as a plastic reinforcing material. Such fibers fit into this application very nicely due to their very high strength to weight ratio, which exceeds that of steel. Many applications are known wherein such fibers are employed in thermosetting resins such as polyester-styrene type resins or urea formaldehyde resins to form extremely high strength objects. Examples of such applications include fishing poles, archery bows, automobile bodies and rocket casings.

The use of inorganic fibers with thermosetting plastics is, however, subject to certain limitations due to the difficulty or near impossibility of reshaping the article after molding. Thus the art is seeking ways to prepare reinforced molding compositions based on thermoplastic polymers which can be prepared by the polymer manufacturer and shipped to the fabricator in a ready to use, easily handleable form.

In recent years, the various solid polymers of propylene have gained increasing popularity as thermoplastic molding materials for preparing a great variety of molded objects. Thanks to their unique combination of low density, high abrasion and chemical resistance, relatively high softening point and low cost, propylene polymers, particularly the crystalline propylene polymers, appear to be good candidates for use as fiber reinforced thermoplastic compositions.

Until recently, however, exploitation of polypropylene in this application has been seriously impeded by the inability of the inorganic fiber to bond securely to the polymer. Accordingly, though some increase in strength can be realized by reinforcing the polymer with glass or asbestos, the increase is actually not proportional to the added expense and handling difficulties involved in the fabrication.

It has now been found that even further increases in the strength of the reinforced polypropylene can be effected if the aforesaid modified polypropylene is reacted with an organic silane having certain desirable characteristics. Additionally, it has also been found that, in some cases, especially with glass fibers, the increased strength properties are accompanied by an increase in the water resistance of the bond between the polypropylene and the fibrous reinforcement.

In accordance with this invention, inorganic fiber reinforced compositions are provided which comprise a crystalline polypropylene matrix phase and inorganic fiber reinforcing phase wherein the inorganic fibers are coated with the reaction product of a silane having at least one substituent reactive with the surface of the inorganic fiber and at least one acid reactive organic substituent, with crystalline polypropylene that has been chemically modified with an ethylenically unsaturated organic acid or acid anhydride, the latter being hereinafter referred to, for sake of brevity, as "modified polypropylene." The inorganic fiber phase, including the coating thereon, is normally about 5.5 to 88% by weight of the composition, with the polypropylene matrix making up the remainder.

The polypropylene matrix phase of the compositions of this invention can comprise a crystalline propylene polymer of the type referred to as isotactic or stereoregular polypropylene or a crystalline copolymer of propylene with another α-olefin, as for example, ethylene. A class of the latter are normally referred to as "block copolymers" and contain up to about 20 mole percent of the second monomer. All such polymers will hereinafter be referred to generically as "crystalline polypropylene."

It is normally desirable to have a stabilizer or stabilizer system incorporated into the polypropylene to protect it against the action of temperature and/or light. Any of the commonly used polypropylene stabilizers can be used in this application. Typically, a phenolic antioxidant type stabilizer is employed. Other additives, such as for example, pigments, can also be included in the crystalline polypropylene phase, if needed.

The modified polypropylene comprises crystalline polypropylene which has been chemically modified by reaction with an ethylenically unsaturated carboxylic acid or anhydride, wherein the ethylenic unsaturation is on a carbon atom which is in a position alpha to the carboxyl group or anhydride. Examples of such acids and anhydrides include maleic acid, fumaric acid, itaconic acid, citrconic acid, acrylic acid, methacrylic acid, crotonic acid, isocrotonic acid, mesaconic acid, angelic acid, maleic anhydride, itaconic anhydride, and citraconic anhydride, inter alia. The preferred modifiers are maleic anhydride and acrylic acid.

The modified polypropylene is prepared by treating the polymer to produce on the chain active sites at which the modifying compound can anchor through its double bond. Such active centers can readily be induced in known ways, as for example, by subjecting the polymer to the action of high energy ionizing radiations such as gamma rays, X-rays, or high speed electrons, or by contacting the polymer, either as a solid or dissolved in a solvent, with a free radical producing material such as a peroxide. Preferably, the modified polypropylene is prepared by reacting the unsaturated polycarboxylic acid or derivative thereof with a solution of the polymer in an organic solvent containing a free radical producing material, such method being described in Belgian Patent No. 607,269.

The modified polypropylene contains the unsaturated acid or derivative in a quantity sufficient to provide about 0.15 to 10.0, preferably 0.3 to 3.5% actual or potential carboxyl group by weight of the modified polymer. As an example of calculating the weight percent of actual or potential carboxyl groups present in the modified polymer, the addition of 1 part maleic anhydride to 99 parts of base polymer is calculated to result in a modified polymer containing 0.908% potential carboxyl group, as follows:

$$1\% \times \frac{90}{98} \frac{\text{molecular weight of 2 COOH groups}}{\text{(molecular weight of maleic anhydride)}} = 0.908$$

The modified polypropylene should have a reduced specific viscosity (RSV) of about 0.1 to 5. More preferably, this should be about 0.3 to 3.5. Optimum viscosity levels within these ranges are easily determined by experimentation. By "reduced specific viscosity" is meant $\eta_{sp}/c$ determined on a 0.1% solution of the polymer in decahydronaphthalene at 135° C.

The silane which is employed must contain both a substituent reactive with the surface of the inorganic fiber and an acid reactive organic substituent. The most common substituents reactive with the fiber are hydroxyl, alkoxyl and halide groups, depending upon the inorganic fiber which is used. Silanes containing any of these substituents are useful in the invention; those having hydroxyl or alkoxyl groups are preferred. The acid reactive substituent can be epoxy, hydroxyl, amino, hydroxyalkyl, isocyanato, mercapto; inter alia. The preferred acid reactive substituents are hydroxyl, epoxy and amino groups, as compounds containing such groups are readily available and easily handled without unpleasant or undesirable by-products. Structurally, the silane will have the formula $(X)_n$—Si—$(Y)_m$ where X is the inorganic fiber reactive group, Y is the acid reactive organic group, $n$ and $m$ are integers from 1 to 3, and the sum of $n$ and $m$ is equal to 4. Examples of such compounds include epoxyethyltriethoxy silane, α-glycidoxypropyltrimethoxy silane, glycidoxyethyltriethoxy silane, 1,2-epoxybutyltriethoxy silane, 1,2-epoxybutoxypropyltriethoxy silane, β-(3,4-epoxycyclohexyl)ethyltrimethoxy silane, α-aminopropyltriethoxy silane, aminoethyltriethoxy silane, α-aminobutyltriethoxy silane, bis(β-hydroxyethyl) α-aminopropyltriethoxy silane, and the like.

The silane and the modified polypropylene are reacted in approximately equimolar portions to form the coating for the fibers. This reaction can be conducted either by first treating the inorganic fibers with the silane and thereafter forming the silane modified polypropylene in situ thereon, or by first prereacting the two components and thereafter applying the reaction product to the fibers. No preference, in terms of results, can be expressed for one technique over the other. In either case, the total amount of the reaction product applied to the fibers should be about 1 to 18%, based upon the weight of the fibers, in order to assure the best possible bonding with the crystalline polypropylene.

The glass fibers which are used as the reinforcing fibers are well known and are readily available commercially. They are prepared by extruding molten glass through a spinning head or bushing containing a plurality of very fine diameter orifices, drawing the resulting filaments down to an even finer diameter, cooling them and collecting them onto bobbins.

In order to protect the fibers from breakage due to abrasion between fibers during the initial collection thereof onto bobbins or other collecting means, it is customary to apply a sizing thereto immediately after spinning and prior to the initial collection. The silanes are frequently applied to serve this purpose. In such a case, they are applied from water solution and the excess water is removed, as by baking. Thus, glass fibers are commercially available which contain a silane already coated thereon. If this silane contains an acid reactive organic group, it can be used in the invention without further treatment.

If another type of process sizing has been applied to the glass fibers during their manufacture, such sizing should be removed prior to the application to the glass of the silane or silane-modified polypropylene reaction product. This is usually readily accomplished by heat treating the fibers at a temperature sufficient to decompose all of such sizing.

When asbestos fibers are employed, the type of asbestos is not critical, e.g., the anthophyllite or chrysotile types are each useable. Normally the asbestos fibers will be deflocculated to separate and disperse bundles of naturally occurring fiber aggregates into discrete individual fibers. This can be accomplished by known methods, e.g., according to the techniques disclosed in U.S. 2,626,213 or 2,661,287. The individualized fibers can then be used in the form of the resulting suspension, or they can be transferred to a proper organic medium for use in subsequent operations or they can be isolated and dried prior to use in subsequent operations. The choice here depends upon the method of proceeding selected for the said subsequent operations. In some instances, the asbestos fibers can be employed in their naturally occurring form without being individualized.

The reaction of the organo silane and modified polypropylene is effected simply by bringing the two reactants together at an elevated temperature in the presence of an inert solvent. The nature of the reaction products is very complex and attempts to ascertain the precise structure thereof have been unsuccessful.

If the silane has been first applied to the fibers, as for example, as a sizing in manufacture of glass fibers, it can readily be reacted with the modified polypropylene by simply bringing the treated fibers into contact with the polymer in a heated solution of the modified polymer in an inert organic solvent. The thus treated fibers are then ready to be incorporated into the polymer matrix.

In another embodiment, the modified polypropylene is reacted with the silane prior to the application thereof to the inorganic fiber. In this case, the modified polypropylene is dissolved in hot solvent, the silane is added, and the mixture is refluxed for several hours till all of the silane has reacted with the modified polymer. The resulting solution can then be applied to the fibers by immersing the same in a vessel containing the reaction product. The prereacted product also presents the very attractive possibility of being able to be applied from an aqueous dispersion. This permits its application to a glass fiber immediately after formation of the fibers at the spinning head, or bushing, in the manner normally used for applying process sizing to glass fibers prior to collection. The reaction product can thus serve as the process sizing as well as to promote adhesion.

The treated fibers can be in any form desired for incorporation in the crystalline polypropylene matrix. That is to say, it can be used in the form of rovings, woven into fabrics or as short length fibers. The form employed is dependent upon the form of composition desired. If it is desired to prepare an injection molding powder, the fiber is incorporated into the polymer as short length fibers, preferably on the order of 1/16 to 3/4 inch in length. For ordinary compression molding powder, either the short fibers or small swatches of woven fabric can be employed. In either case, these short fibers are physically mixed into the polymer powder and become embedded in the polymer matrix upon molding. If a composition for vacuum forming or the like is desired, a laminate can be prepared comprising a plurality of alternating plies of fabric and crystalline polypropylene film. Compositions suitable for either compression molding or injection molding can be prepared by applying the polymer directly to a sized glass roving and thereafter reducing the coated roving to molding powder size. The sized roving can be drawn through a vessel containing a viscous solution or melt of the polypropylene and the polymer thus picked up is cooled immediately upon leaving the vessel, then passed on to a cutting or chopping means, where it is reduced to molding powder size. The coating can also be applied by extrusion onto the sized roving in a manner analogous to a wire coating operation.

In another method of proceeding, the modified polypropylene can be melt blended with the unmodified polypropylene. The glass, treated with the specified silane, is then incorporated into the mixture and the reaction between the silane and the acid modified polypropylene takes place in situ.

The invention will now be illustrated with several illustrative examples. Parts and percentages are by weight unless otherwise indicated.

EXAMPLES 1–4

Crystalline polypropylene having an RSV of 4.0 (measured in 0.1% solution in decahydronaphthalene at 135° C.) was modified to prepare polymers having, respectively 0.4, 0.9, 1.9, and 3.3% chemically combined maleic anhydride. This was accomplished by heating, under nitrogen, solutions of 100 parts stereoregular polypropylene, sufficient maleic anhydride to yield the desired amount of chemical modification, and 1 part benzoyl peroxide in 1,000 parts chlorobenzene at 112–120° C. for one-half hour, followed by refluxing for about one hour. Upon cooling, the modified polymer precipitated out of solution and was isolated from the solvent.

Sections of glass fabric 7" wide x 40" in length were heat cleaned at 750° F. to burn off all organic matter on the surface thereof. These were then dipped in a 1% distilled water solution, of γ-glycidoxypropyltrimethoxy silane, allowed to drip dry, and hung to dry overnight.

A 1% solution was prepared of each of the modified propylene polymers in a hot xylene solvent containing 0.025% laurylthiodipropionate and 0.02% butylated cresol-crotonaldehyde reaction product as stablizers for the polymer. In order to dissolve the modified polypropylene, the xylene was heated to about 120° C. and maintained at about that temperature during application to the glass.

The glass fabric was immersed in the hot solution of modified polypropylene and allowed to sit for two hours at 130° C. At the end of the two hours, the fabric was removed from the solution, washed three times with the hydrocarbon solvent at 130° C., then dried under vacuum of about 29 in Hg for 4 hours at 75° C.

Laminates of the above fabric with crystalline polypropylene were prepared by cutting the fabric into squares of about 5¾" on a side and alternating these in a 6 x 6" picture frame mold with like size squares of 6 mil polypropylene film. Thirteen plies of the film were used with 12 plies of the fabric, resulting in a structure having polypropylene on each exposed surface with all of the glass fabric in its interior. These were molded by heating at 235° C. for 3 minutes at contact pressure, followed by 3 minutes at 235° C. at 500 p.s.i. and thereafter cooling to 20° C. at 500 p.s.i. The resulting laminates were approximately ⅛" in thickness.

Simultaneously, control laminates of reinforced crystalline polypropylene and of crystalline polypropylene reinforced with glass fabric coated only with maleic anhydride modified crystalline polypropylene were prepared.

Test specimens measuring 1 x ⅛ inch were cut from each laminate and tested for flexural properties following ASTM standard test D–790 using a crosshead speed of 0.2 inch per minute. Flexural properties of these samples were as follows:

| Example No. | Glass treatment | Percent maleic anhydride | Percent polymer | Flex Properties | |
|---|---|---|---|---|---|
| | | | | Strength (p.s.i.) | Modulus (p.s.i.) ÷10⁶ |
| Control A | (Unreinforced polypropylene). | | 100 | 8200 | 0.53 |
| Control B | MAMCP ¹ | 0.4 | 28.9 | 26,080 | 1.99 |
| Control C | MAMCP ¹ | 3.3 | 28.5 | 33,270 | 2.34 |
| 1 | MAMCP/silane | 0.4 | 29.1 | 33,070 | 2.15 |
| 2 | do | 0.9 | 27.6 | 37,870 | 2.27 |
| 3 | do | 1.9 | 29.0 | 37,500 | 2.08 |
| 4 | do | 3.3 | 27.8 | 37,570 | 2.14 |

¹ Maleic anhydride modified crystalline polypropylene.

Other specimens of the same laminates were then subjected to severe hydrolytic testing by boiling in water for 72 hours. After drying, these samples were tested for their flexural properties using the same ASTM standard test D–790. Flexural properties were now as follows:

| Example No. | Flex strength | Modulus | Percent strength retention |
|---|---|---|---|
| Control B | 14,530 | 1.83 | 55.7 |
| Control C | 11,790 | 1.57 | 35.4 |
| 1 | 20,040 | 2.08 | 60.6 |
| 2 | 21,290 | 2.13 | 56.3 |
| 3 | 30,990 | 2.13 | 94.0 |
| 4 | 33,170 | 2.21 | 88.3 |

The data clearly show both the improvement in flexural properties effected by the process of the invention and the greater resistance to hydrolysis of the compositions reinforced with the silane-modified polypropylene treated glass.

EXAMPLE 5

Glass fiber was heat cleaned in the manner set forth above and coated with the prereacted reaction product of maleic anhydride modified crystalline polypropylene and γ-glycidoxypropyltrimethoxy silane. This reaction product was prepared by dissolving 20 parts of the modified polypropylene containing 0.6% maleic anhydride, 0.01 part lauryl thiodipropionate and 0.02 part of the condensation product of 1 mole of crotonaldehyde with 3 moles of 6-t-butyl m-cresol in 200 parts of the hydrocarbon solvent described in Example 1. The mass was heated at 125° C. to dissolve the polymer, following which 0.96 part of γ-glycidoxypropyltrimethoxy silane was added and the solution was held at 125° C. for about 1½ hours. Upon cooling, the reaction product precipitated, but was left in the solvent.

To apply the reaction product to the glass fabric, the solvent was reheated to 125° C. until all solid material was once again in solution. Sections of glass fabric were immersed in the solution, allowed to sit for about 5 minutes at 130° C., after which they were rinsed 3 times with hot solvent, then dried upon vacuum.

Laminates of this fabric with crystalline polypropylene film were prepared in the manner described above. These were tested for their flexural properties before and after hydrolytic exposure. Results are as follows:

Dry properties:
    Flex strength (p.s.i.) _____ 40,020
    Modulus (p.s.i.) ÷10⁶ _____ 2.29
After 72 hours boil:
    Flex strength (p.s.i.) _____ 24,190
    Modulus (p.s.i.) ÷10⁶ _____ 2.07
    Percent strength retention _____ 60.4

EXAMPLES 6 AND 7

Heat-cleaned glass cloth was coated with glycidoxypropyl-trimethoxy silane as in Example 1 to 4 above. Sections of this cloth were then treated by immersing in a xylene solution of crystalline polypropylene containing 4.5% chemically combined acrylic acid and refluxing for two hours at 120° C., then washing with hot xylene and drying under vacuum for 4 hours at 75° C. Control samples of the same heat cleaned cloth but without the silane coating were treated simultaneously.

The treated cloth was pressed into laminates with unmodified crystalline polypropylene film (about 31% by weight), and the laminates were tested for flex properties dry and after a 72-hour boil.

Other sections of the cloth were treated similarly with polypropylene modified with 2.1% itaconic acid. Results of testing these laminates are as follows:

| Ex. No. | Modifier | Flex strength (p.s.i.) | | | Modulus (p.s.i.)÷10⁶ | |
|---|---|---|---|---|---|---|
| | | Dry | After boiling | Percent retention | Dry | After boiling |
| 6 | Acrylic acid | 30,800 | 23,200 | 75.5 | 2.21 | 1.91 |
| Control | do | 19,600 | 11,200 | 57.0 | 1.92 | 1.16 |
| 7 | Itaconic acid | 26,800 | 17,900 | 63.4 | 2.06 | 1.79 |
| Control | do | 17,900 | 11,400 | 63.6 | 19.2 | 1.28 |

EXAMPLE 8

Following the procedure outline above, sections of glass cloth were coated with β-(3,4-epoxy cyclohexyl)ethyltrimethoxy silane and then reacted with maleic anhydride modified crystalline polypropylene (1.3% MA). Laminates prepared from this material exhibit flex strength of 33,480 p.s.i. when dry and 28,000 p.s.i. after 72 hours boil, indicating strength retention after boiling of 83.6%.

EXAMPLE 9

When γ-aminopropyltriethoxy silane was employed in place of the silane of Example 8, the flex strength of the laminates was 44,500 p.s.i. when dry and 39,600 p.s.i. or 88.9% of its original flex strength after boiling.

EXAMPLE 10

Fifty (50) parts of chrysotile asbestos was dispersed in 500 parts water in a Waring blendor. The pH of the slurry was adjusted to 6–7 by addition of one gram of acetic acid, and then four grams of γ-glycidoxypropyltrimethoxy silane was added. The slurry was allowed to stand overnight and then 200 parts of acetone and 400 parts of methylene chloride were added to break the suspension. The slurry was vacuum filtered, and one-half of the asbestos fiber paste was mixed with 600 parts of xylene. Nuosperse 657 (5 parts) was added to obtain a stable suspension of the asbestos in xylene. The stirred suspension was heated to 90° C., and 5 parts maleic anhydride modified crystalline polypropylene was added. After one hour at 90° C., 20 parts unmodified crystalline polypropylene was added. Ten minutes later the slurry was cooled. The precipitate of polypropylene and asbestos was filtered and dried overnight in a vacuum oven at 60° C.

The dried material was mixed in a Brabender plastograph for ten minutes at 200° C. under a nitrogen atmosphere at a speed of 50 r.p.m. This material was then compression molded into sheets 0.040 x 6 x 6 inches for tensile testing.

Test results are shown below:

| Surface treatment | Wt. percent abestos | Tensile strength (p.s.i.) | Tensile modulus (p.s.i.) |
|---|---|---|---|
| None | 20 | 5,920 | 430,000 |
| Do | | 4,960 | 195,000 |
| γ-glycidoxypropyl-methoxy silane/ MAMCP | 10 | 7,700 | 410,000 |
| Do | 18.9 | 8,900 | 510,000 |

In addition to acting as an efficient sizing and primer for bonding glass fibers to polypropylene, it has been found that glass rovings coated with the silane-modified polypropylene reaction product exhibit greatly improved knot strength as compared with ordinary glass fiber roving. Ordinary unsized glass rovings, or those sized with presently known commercial sizes, exhibit virtually no knot strength and break with any attempt to knot them. The glass rovings of this invention can be knotted and the knot pulled tight wihout breakage of the fibers. It has also been noted that these fibers exhibit greatly improved lubricity and abrasion resistance thanks to the presence of the modified polypropylene. Thus, glass rovings treated with the modified polypropylene-silane reaction product of this invention are useful products even when they are not employed as polypropylene reinforcing agents.

What I claim and desire to protect by Letters Patent is:

1. A composition comprising an inorganic fiber reinforcing phase and a crystalline polypropylene matrix phase, the fibers of said fiber phase being coated with the product obtained by reacting a silane having at least one substitutent reactive with the inorganic fibrous material and at least one acid reactive organic substituent with crystalline polypropylene modified by addition thereto of an α,β-ethylenically unsaturated acid or anhydride.

2. The composition of claim 1 where the inorganic fibers are glass or asbestos.

3. The composition of claim 2 where the silane and the modified polypropylene are reacted in substantially equimolar portions.

4. The composition of claim 3 where the glass fibers are coated with about 1 to 18% by weight of the reaction product based on the weight of the inorganic fibers.

5. The composition of claim 4 containing about 5.5 to 88% coated glass fibers and about 94.5 to 12% unmodified crystalline polypropylene.

6. The composition of claim 5 where the acid-reactive organic substituent of the silane is an epoxy group and the substituent reactive with the inorganic fibers is an alkoxyl, hydroxyl or halide group.

7. The composition of claim 6 where the silane is selected from the class consisting of glycidoxypropyltrimethoxy silane and β-(3,4-epoxycyclohexyl) ethyltrimethoxy silane.

8. The composition of claim 7 where the modified polypropylene contains about 0.15 to 10% of a modifier selected from the class consisting of maleic anhydride, itaconic acid and acrylic acid.

9. The composition of claim 8 where the inorganic fibers are glass.

10. The composition of claim 8 where the inorganic fibers are asbestos.

11. The composition of claim 5 where the acid-reactive organic substituent of the silane is an amino group and the glass-reactive substituent is an alkoxyl hydroxyl or halide group.

12. The composition of claim 11 where the silane is γ-aminopropyltriethoxy silane.

13. The composition of claim 12 where the modified polypropylene contains about 0.15 to 10% of a modifier selected from the class consisting of maleic anhydride, acrylic acid, and itaconic acid.

14. A laminate comprising a matrix of crystalline polypropylene reinforced with layers of glass fabric, said glass fabric having a coating comprised of the reaction product of a silane having at least one glass-reactive substituent and at least one acid-reactive organic substituent with crystalline polypropylene modified by addition thereto of about 0.15 to 10% by weight of an α,β-ethylenically unsaturated acid or anhydride.

15. A laminate comprising a matrix of crystalline polypropylene reinforced with glass fibers coated with about about 1 to 18%, based on the weight of said glass fibers, of the reaction product of a silane having at least one glass-reactive substituent and at least one acid-reactive organic substituent selected from the class consisting of amines and epoxides with an equimolar portion of crystalline polypropylene modified by chemical addition thereto of 0.15 to 10% of a modifier selected from the class consisting of α,β-unsaturated organic acids and anhydrides.

16. The laminate of claim 15 where the silane is glycidoxypropyltrimethoxy silane and the polypropylene modifier is maleic anhydride.

17. The laminate of claim 15 where the silane is γ-aminopropyltriethoxy silane and the polypropylene modifier is maleic anhydride.

18. The laminate of claim 15 where the silane is γ-aminopropyltriethoxy silane and the polypropylene modifier is acrylic acid.

19. The laminate of claim 15 where the silane is glycidoxypropyltrimethoxy silane and the polypropylene modifier is maleic anhydride.

20. The laminate of claim 15 where the silane is γ-aminopropyltriethoxy silane and the polypropylene modifier is itaconic acid.

21. The laminate of claim 15 where the silane is glycidoxypropyltrimethoxy silane and the polypropylene modifier is itaconic acid.

22. Glass fibers coated with the reaction product of a silane containing at least one glass-reactive substituent and at least one acid-reactive organic substituent selected from the class consisting of epoxy and amino groups with crystalline polypropylene modified by chemical addition thereto of about 0.15 to 10% by weight of a modifier selected from the class consisting of α,β-unsaturated organic acids and anhydrides.

23. A composition of matter comprising a mixture of glass fibers coated with a silane having at least one glass-reactive substituent and at least one acid-reactive organic substituent, crystalline polypropylene modified by addition thereto of about 0.15 to 10% by weight of an α,β-ethylenically unsaturated acid or anhydride, and unmodified crystalline polypropylene.

24. The composition of claim 23 where the silane is glycidoxypropyltrimethoxy silane and the modified polypropylene is modified with maleic anhydride, itaconic acid or acrylic acid.

25. The composition of claim 23 where the silane is γ-aminopropyltriethoxy silane and the modified polypropylene is modified with maleic anhydride, itaconic acid or acrylic acid.

26. The composition of claim 23 where the glass fibers are in the form of short fibers about 1/16 to 3/4 inch in length.

References Cited

UNITED STATES PATENTS 3,013,915   12/1961   Morgan _____ 161—193
3,306,800   2/1967    Plueddemann _____ 161—193

ROBERT F. BURNETT, *Primary Examiner.*

WILLIAM J. VAN BALEN, *Assistant Examiner.*

U.S. Cl. X.R.

117—76, 126; 161—170, 193, 205; 260—41; 264—90, 175

U.S. DEPARTMENT OF COMMERCE
PATENT OFFICE
Washington, D.C. 20231

UNITED STATES PATENT OFFICE
CERTIFICATE OF CORRECTION

Patent No. 3,437,550                                                          April 8, 1969

James T. Paul, Jr.

It is certified that error appears in the above identified patent and that said Letters Patent are hereby corrected as shown below:

Column 5, line 36, "1 x 1/8" should read -- 1 x 3 x 1/8 --. Column 8, line 40, cancel "about".

Signed and sealed this 7th day of April 1970.

(SEAL)
Attest:

Edward M. Fletcher, Jr.                            WILLIAM E. SCHUYLER, JR.
Attesting Officer                                              Commissioner of Patents